(12) United States Patent
Tomoeda et al.

(10) Patent No.: US 7,134,600 B2
(45) Date of Patent: Nov. 14, 2006

(54) IC-CARD SERVICE PERIOD SETTING METHOD, IC CARD, IC CARD CASE AND BATTERY CHARGER

(75) Inventors: Yuuki Tomoeda, Yokohama (JP); Hiroshi Watanabe, Yokohama (JP); Hideo Shimizu, Kawasaki (JP); Kenji Kojima, Kawasaki (JP); Tatsuyuki Matsushita, Yokohama (JP); Kentaro Umesawa, Yokohama (JP); Hideyuki Miyake, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 238 days.

(21) Appl. No.: 10/720,100

(22) Filed: Nov. 25, 2003

(65) Prior Publication Data

US 2004/0149816 A1 Aug. 5, 2004

(30) Foreign Application Priority Data

Jan. 31, 2003 (JP) ............................. 2003-023220

(51) Int. Cl.
*G06K 7/08* (2006.01)
(52) U.S. Cl. ..................... 235/451; 235/441; 235/492; 235/375; 235/376; 235/486
(58) Field of Classification Search ................ 235/375, 235/376, 380, 486, 492, 441, 451
See application file for complete search history.

(56) References Cited

U.S. PATENT DOCUMENTS

| 4,275,405 A | | 6/1981 | Shannon | |
|---|---|---|---|---|
| 4,523,087 A | * | 6/1985 | Benton | 235/379 |
| 4,523,297 A | * | 6/1985 | Ugon et al. | 708/131 |
| 4,575,621 A | * | 3/1986 | Dreifus | 235/380 |
| 4,827,111 A | * | 5/1989 | Kondo | 235/380 |
| 5,012,076 A | * | 4/1991 | Yoshida | 235/379 |
| 5,065,155 A | * | 11/1991 | Oogita et al. | 340/825.56 |
| 5,247,164 A | * | 9/1993 | Takahashi | 235/492 |
| 5,310,998 A | * | 5/1994 | Okuno | 235/380 |
| 5,521,586 A | * | 5/1996 | Takeshita | 340/635 |
| 5,760,644 A | | 6/1998 | Lancaster et al. | |
| 6,811,083 B1 | * | 11/2004 | Kojima et al. | 235/451 |

FOREIGN PATENT DOCUMENTS

| JP | 10-189780 | 7/1998 |
|---|---|---|
| JP | 2001-312711 | 11/2001 |
| JP | 2001-319213 | 11/2001 |

* cited by examiner

*Primary Examiner*—Kimberly D. Nguyen
(74) *Attorney, Agent, or Firm*—Oblon, Spivak, McClelland, Maier & Neustadt, P.C.

(57) ABSTRACT

A method of setting validity period of IC card, comprises preparing IC card including change unit whose state changes with lapse of time starting from initial state without external power, measuring unit configured to measure state of change unit so as to generate information indicating whether or not validity period has elapsed, and operation unit configured to be operable if information indicates that validity period fails to have yet elapsed, and to be inoperable if information indicates that validity period has elapsed, preparing IC card case capable to house IC card by user, IC card case including identification unit configured to determine whether or not user is legitimate, performing user identification utilizing identification unit, when IC card is housed in IC card case, and transmitting signal to change unit in IC card depending on result of user identification, signal initializing change unit to initial state.

7 Claims, 9 Drawing Sheets

IC-CARD SERVICE PERIOD SETTING METHOD, IC CARD, IC CARD CASE AND BATTERY CHARGER

CROSS-REFERENCE TO RELATED APPLICATIONS

This application is based upon and claims the benefit of priority from the prior Japanese Patent Application No. 2003-023220, filed Jan. 31, 2003, the entire contents of which are incorporated herein by reference.

BACKGROUND OF THE INVENTION

1. Field of the Invention

The present invention relates to an IC card and an IC card case devised to prevent illegal use and battery charger for supplying power to the IC card case.

2. Description of the Related Art

Integrated circuit (IC) cards have come to be used in various fields as employee ID cards, club member ID cards, insurance ID cards, etc., in addition to business transaction cards, such as credit cards and debit cards. Since IC cards are equipped with a CPU, ROM, RAM, EEPROM, etc., which are not incorporated in conventional magnetic cards, they can have various functions and are hard to forge, which significantly enhances their security. Therefore, IC cards are often used to store personal information (see, for example, Jpn. Pat. Appln. KOKAI Publication No. 2001-312711).

Attention has recently been paid to power analysis attacks against IC cards. In these attacks, the key used in an encryption scheme, such as DES and RSA, which is often utilized when IC cards are identified by a card reader, is found by analyzing the power consumed while the decryption algorithm is being executed. Such methods as the above for attacking IC cards without opening the cards have greatly advanced.

As described above, IC cards are hard to forge and hence have come to be widely used to store personal information, while IC card attacking methods have greatly advanced. Therefore, if an IC card is lost and acquired by a third party, it can be used illegally, resulting in serious damage.

As a countermeasure to cope with, for example, an IC card being lost and acquired by a third party, the amount of money that can be transacted in a single month is limited, or the number of occasions the card can be used is limited. However, this is not a fundamental solution for preventing illegal use when an IC card is lost. As another countermeasure, some IC cards have a built-in timer for limiting the period of the validity of the card. In this case, however, a power supply must be incorporated in the card to allow the timer to operate continuously, which is a serious problem for IC cards, as their specifications are limited.

BRIEF SUMMARY OF THE INVENTION

The preset invention has been developed in light of the above, and aims to provide an IC card and IC card case that can prevent their illegal use without a power supply, even if they are lost, simply by changing the data stored in the card and/or the structure of the card.

According to a first aspect of the invention, there is provided a method of setting a validity period of an IC card, comprising: preparing an IC card including a change unit whose state changes with lapse of time starting from an initial state without an external power, a measuring unit configured to measure the state of the change unit so as to generate information indicating whether or not the validity period has elapsed, and an operation unit configured to be operable if the information indicates that the validity period fails to have yet elapsed, and to be inoperable if the information indicates that the validity period has elapsed; preparing an IC card case capable to house the IC card by a user, the IC card case including an identification unit configured to determine whether or not the user is legitimate; performing user identification utilizing the identification unit, when the IC card is housed in the IC card case; and transmitting a signal to the change unit in the IC card depending on a result of the user identification, the signal initializing the change unit to the initial state.

According to a second aspect of the invention, there is provided an IC card unusing a built-in power supply and driven by an external power supplied from an external device when the IC card is connected to the external device, the IC card comprising: a change unit whose state changes with lapse of time starting from an initial state without the external power; a measuring unit configured to measure the state of the change unit so as to generate information indicating whether or not a period has elapsed; and an operation unit configured to be operable if the information indicates that the period fails to have yet elapsed, and to be inoperable if the information indicates that the period has elapsed.

According to a third aspect of the invention, there is provided an IC card case capable to house an IC card by a user, the IC card starting measurement of a period in response to an instruction and continuing the measurement without an external power, the IC card being usable if the period fails to have elapsed and being unusable if the period has elapsed, the IC card case comprising: an identification unit configured to determine whether or not the user is legitimate; a performing unit configured to perform user identification utilizing the identification unit, when the IC card is housed in the IC card case; and a transmission unit configured to transmit a signal to the IC card depending on a result of the user identification, the signal initializing the IC card to the initial state.

According to a fourth aspect of the invention, there is provided a charger to be connected to an IC card case to charge a battery unit provided in the IC card case capable to house an IC card by a user, the battery unit being configured to issue an instruction to the IC card, the IC card starting measurement of a period in response to the instruction, and continuing the measurement without an external power, the IC card being usable if the period fails to have elapsed and being unusable if the period has elapsed, the charger comprising: a determination unit configured to determine whether or not the IC card case is a preset IC card case, when the IC card case is connected to the charger; and a charging unit configured to charge the battery unit if the determination unit determines that the IC card case is the preset IC card case.

DETAILED DESCRIPTION OF THE INVENTION

An embodiment of the invention will be described in detail with reference to the accompanying drawings.

Figure 1:
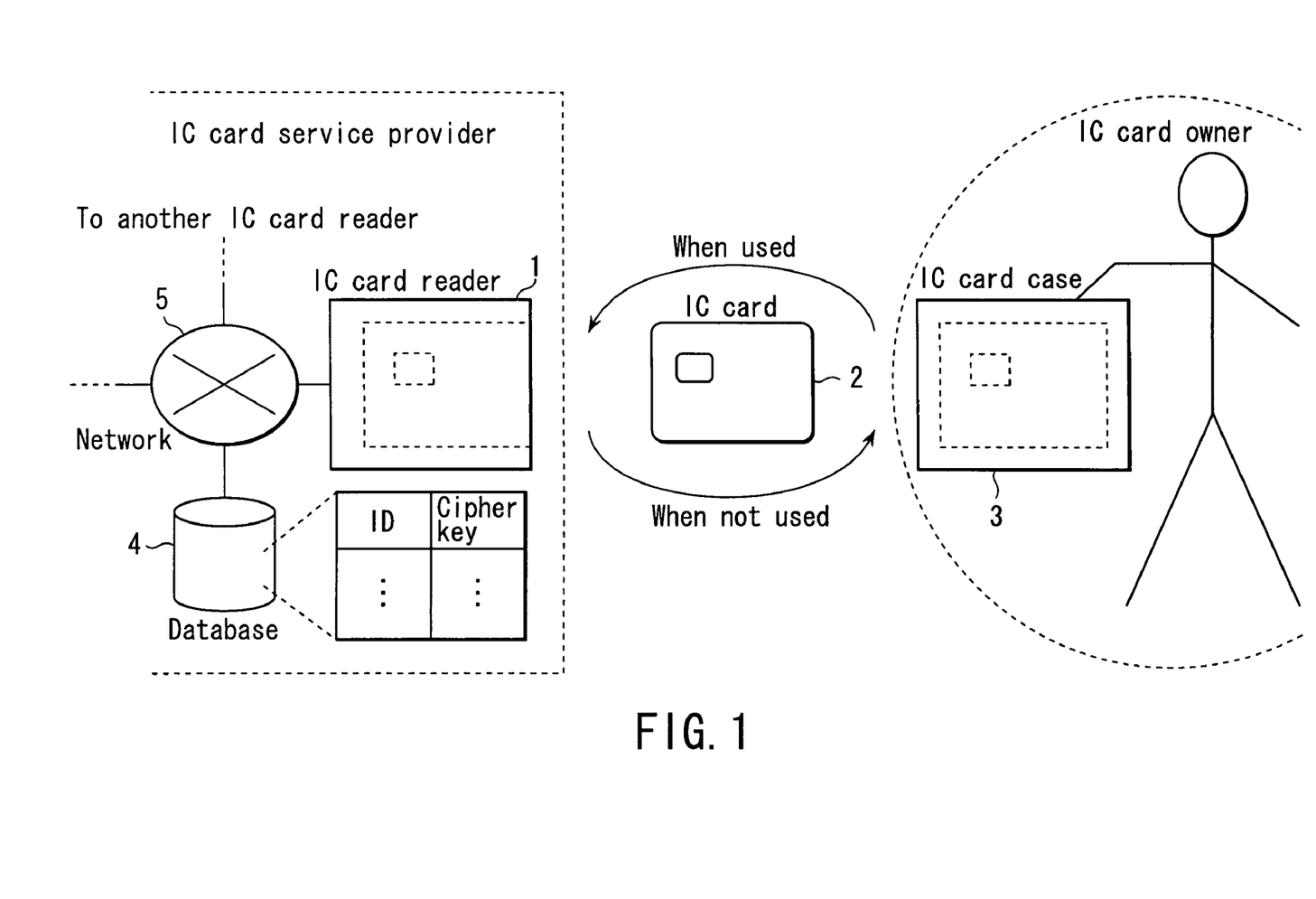
FIG. 1 illustrates the whole system according to an embodiment of the invention.

FIG. 1 illustrates the whole system according to the embodiment.

In this system, an IC card service provider provides services through an IC card 2. The owner of the IC card 2, who can utilize the services, stores it in an IC card case 3 when the owner does not utilize the services. On the other hand, to utilize the services, the owner takes the card 2 out of the card case 3 and inserts it into an IC card reader 1 owned by the IC card service provider.

A database 4 stores and manages data concerning IC card owners who utilize the services, in a centralized manner. In the embodiment, the database 4 stores at least an ID and cipher key assigned to each IC card 2, in relation to each other.

A large number of IC card readers 1 are provided by the IC card service provider, and connected to the database 4 via a network 5. In the case of the services that are provided only at a particular place, it is a matter of course that the IC card reader 1 may store the database 4 and the network 5 may not be used.

Figure 2:
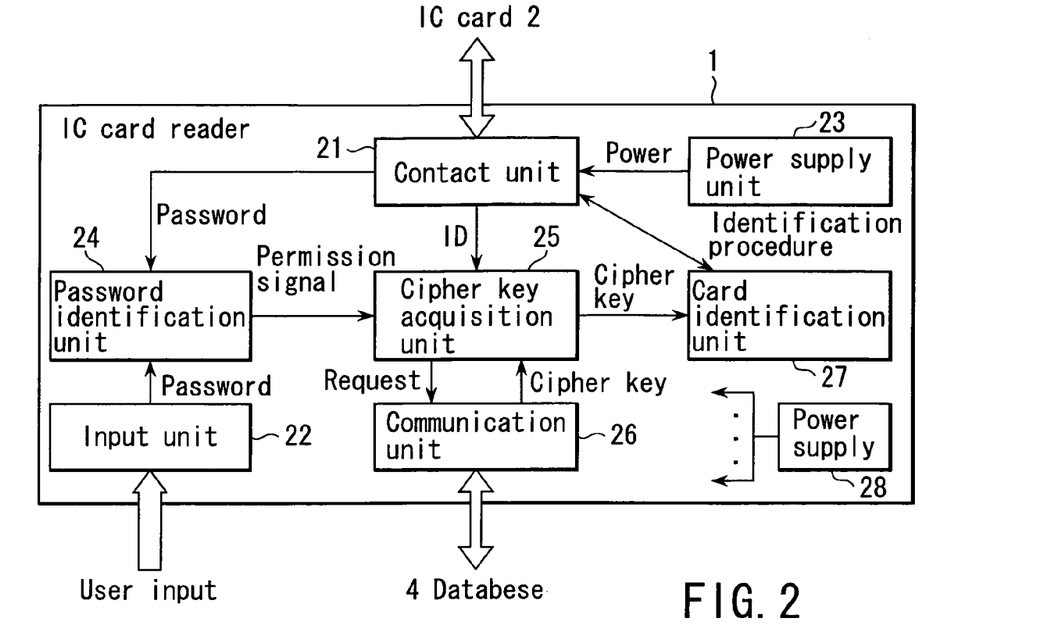
FIG. 2 is a block diagram illustrating the configuration of an IC card reader 1 used in the embodiment.

FIG. 2 is a block diagram illustrating the configuration of the IC card reader 1.

In FIG. 2, a contact unit 21 is an interface that is electrically connected to the IC card 2 when the IC card 2 is inserted in the IC card reader 1, and exchanges data with the IC card 2. An input unit 22 is used when the owner of the IC card 2 inputs a password or any other data. A power supply unit 23 supplies power to the IC card 2 via the contact unit 21 when the IC card 2 is inserted.

A password identification unit 24 reads a password from the IC card 2 via the contact unit 21, thereby determining whether or not the read password is identical to that input from the input unit 22, to confirm the legitimacy of the user. If they are determined to be identical, an allowance signal is output to a cipher key acquisition unit 25.

Upon receiving the allowance signal from the password identification unit 24, the cipher key acquisition unit 25 reads an ID from the IC card 2 via the contact unit 21, thereby issuing a request to the database 4 via a communication unit 26, using the ID, and acquiring therefrom the cipher key uniquely corresponding to the ID.

A card identification unit 27 utilizes the cipher key acquired by the cipher key acquisition unit 25, to confirm the legitimacy of the inserted IC card 2. This identification process will be described later.

A power supply 28 is supplied with an external AC power supply and supplies power to the each internal element of the IC card reader 1. The power supply unit 23 is also supplied with power from the power supply 28.

An IC card owner who utilizes IC card services carries the IC card 2, and inserts the card 2 into the IC card reader 1 when the IC card owner utilizes the services.

Figure 3:
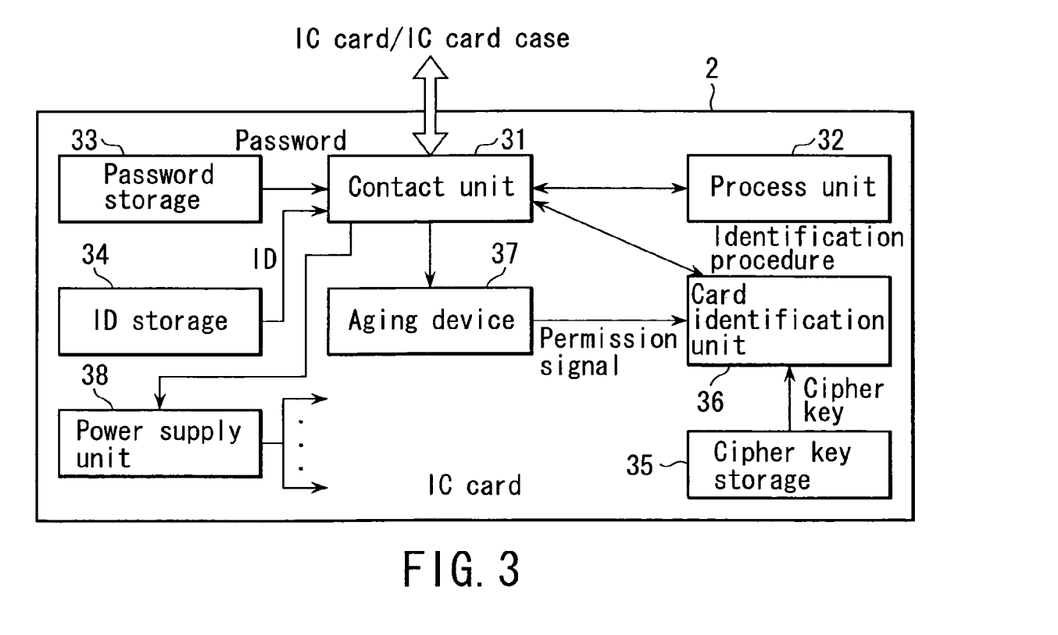
FIG. 3 is a block diagram illustrating the configuration of an IC card 2 used in the embodiment.

FIG. 3 is a block diagram illustrating the configuration of the IC card 2.

In FIG. 3, a contact unit 31 is exposed on the outer surface of the IC card 2 so that it is electrically connected to the contact unit 21 of the IC card reader 1 when the IC card 2 is inserted in the IC card reader 1. When the IC card 2 is inserted in the IC card reader 1, power is supplied from the power supply unit 23 of the IC card reader 1 to the power supply unit 38 of the IC card 2 via the contact unit 31. The power supply unit 38 supplies each element in the IC card 2.

A process unit 32 performs various procedures while services are being utilized in the IC card 2.

A password storage 33 stores a password for using the IC card 2. In general, passwords are stored in IC cards 2 when the cards 2 are distributed to users. An ID storage 34 stores an ID from which the IC card 2 is identified. In general, IDs are stored in IC cards 2 when the cards 2 are manufactured. A cipher key storage 35 stores a cipher key assigned to the IC card 2. Generally, cipher keys are stored in IC cards 2 when the cards 2 are distributed to users.

A card identification unit 36 cooperates with the card identification unit 27 to determine whether or not the IC card 2 is used by a legitimate user, when the IC card 2 is inserted in the IC card reader 1.

An aging device 37 can determine whether or not a predetermined time period has elapsed. When the aging device 37 operates, it is not necessary to supply power thereto. When the aging device 37 is supplied with power (device charging power) via the contact unit 31 from the IC card case 3 described later, it starts time measurement. The aging device 37 is referred to by the card identification unit 36, when the IC card 2 is connected to the IC card reader 1 and the card identification unit 36 performs identification.

The aging device 37 will now be described in detail.

Figure 4:
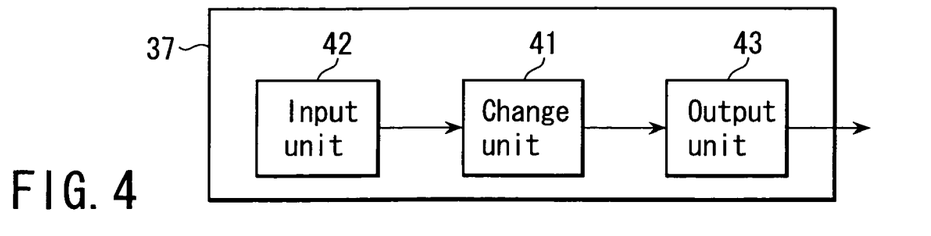
FIG. 4 is a block diagram illustrating the basic concept of an aging device 37.

FIG. 4 is a block diagram illustrating the basic concept of the aging device 37. The aging device 37 comprises a change unit 41, the state of which changes with lapse of time without a power supply, such as battery; an input unit 42 for inputting an input signal to the change unit 41; and an output unit 43 for outputting an output signal changed relative to the input signal based on the state of the change unit 41. The change in the state of the change unit 41 is utilized to measure time. The input unit 42 and output unit 43 are used to confirm the state of the change unit 41.

Figure 5:
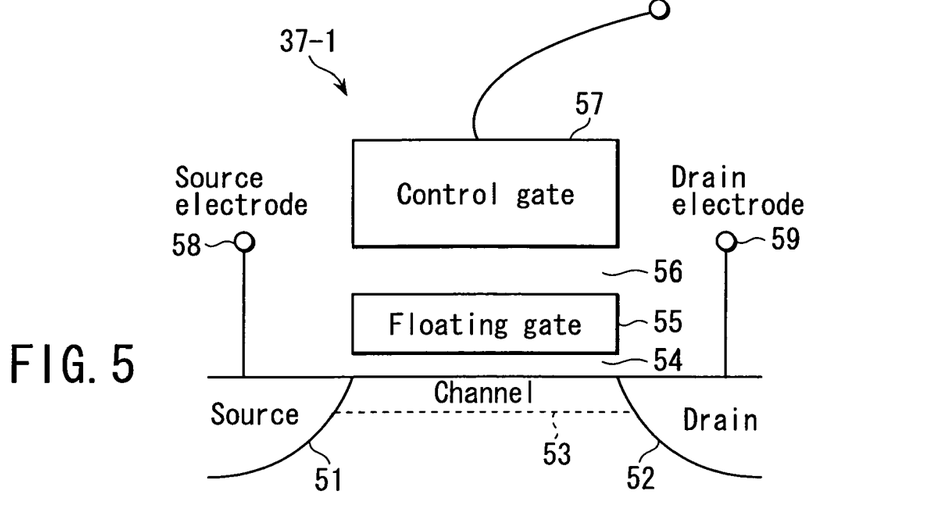
FIG. 5 is a block diagram illustrating a first example for realizing the aging device 37.

FIG. 5 is a block diagram illustrating a first example for realizing the aging device 37 of FIG. 4.

The aging device 37-1 comprises: a first layer having a source region 51, drain region 52 and channel region 53 therebetween; a second layer provided on the first layer and formed of a tunnel insulation film 54; a third layer provided on the second layer and formed of a floating gate 55; a fourth layer provided on the third layer and formed of an insulation film 56; and a fifth layer provided on the fourth layer and formed of a control gate 57. A source electrode 58 and drain electrode 59 are provided on the source and drain regions 51 and 52, respectively.

Figure 6:
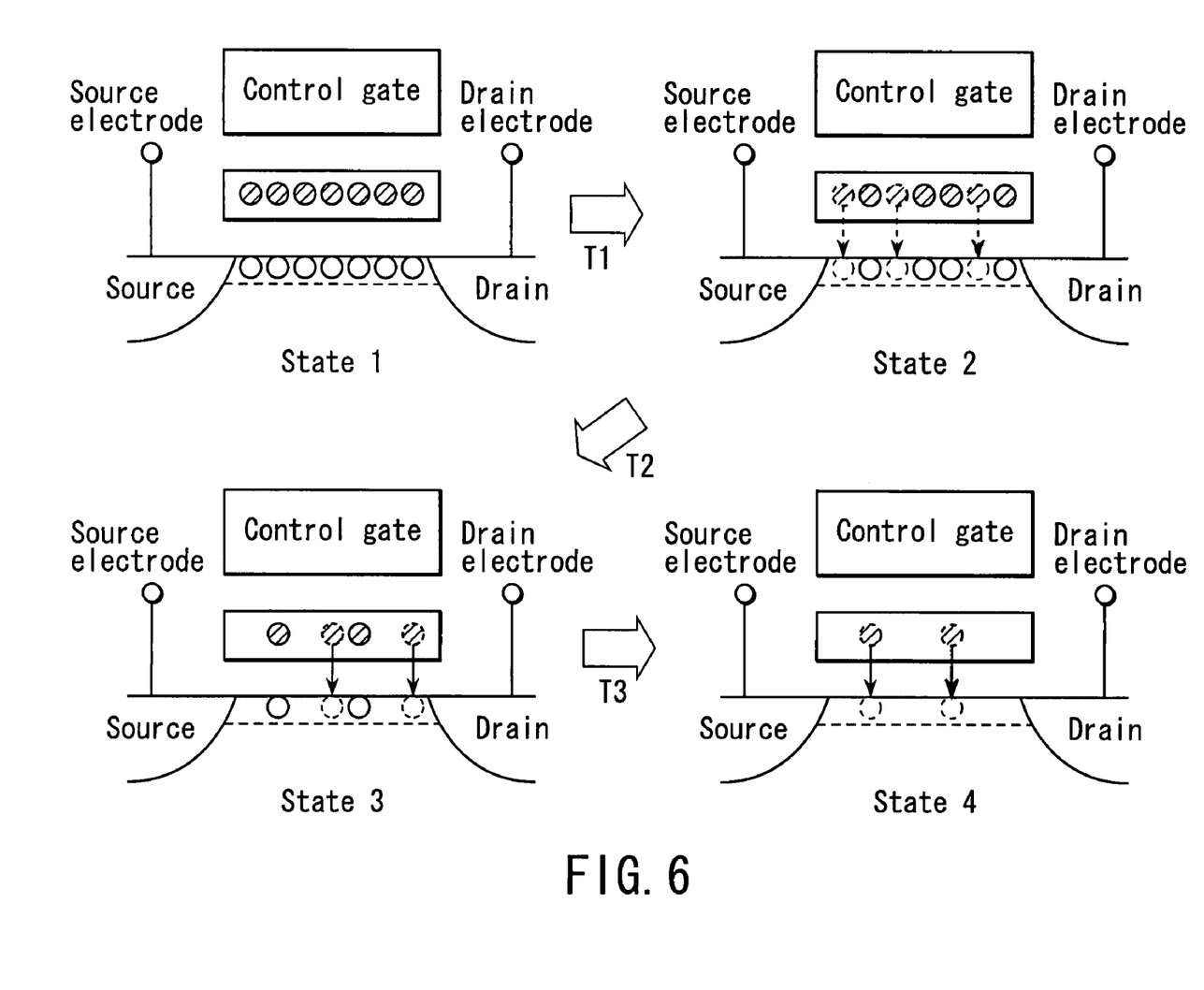
FIG. 6 illustrates changes in the state of an aging device 37-1 with lapse of time.

FIG. 6 illustrates changes with lapse of time in the state of the aging device 37-1 of FIG. 5. In the figure, hatched circles indicate electrons, and white circles indicate positive holes.

In FIG. 6, state 1 is the initial state. In the aging device 37-1 that assumes the state 1, a pre-process is performed, in which the control gate 57 applies a high electric field between the substrate boundary of the channel region 53 and the floating gate 55, thereby injecting electrons from the channel into the floating gate 55 utilizing FN tunneling. At this time, positive holes gather at the substrate boundary of the channel region 53, whereby a channel is defined at the substrate boundary between the source and drain regions 51 and 52.

In the state 1, the electrons in the floating gate 55 gradually shift, by direct tunneling, to the substrate boundary, thereby reducing the level of the electric field at the substrate boundary in the channel region 53. State 2 of FIG. 6 is the state assumed at a time point $T_1$ a certain time period after the state 1. State 3 of FIG. 6 is the state assumed at a time point $T_2$ a certain time period after the state 2. Similarly, state 4 is the state assumed at a time point $T_3$ a certain time period after the state 3. The circles indicated by the broken lines represent the shift of electrons made due to direct tunneling by the respective time points. In the state 4 at the time point $T_3$, most electrons escape from the floating gate 55, therefore the channel at the substrate boundary of the channel region 53 disappears. As a result, no signals are output.

Figure 7:
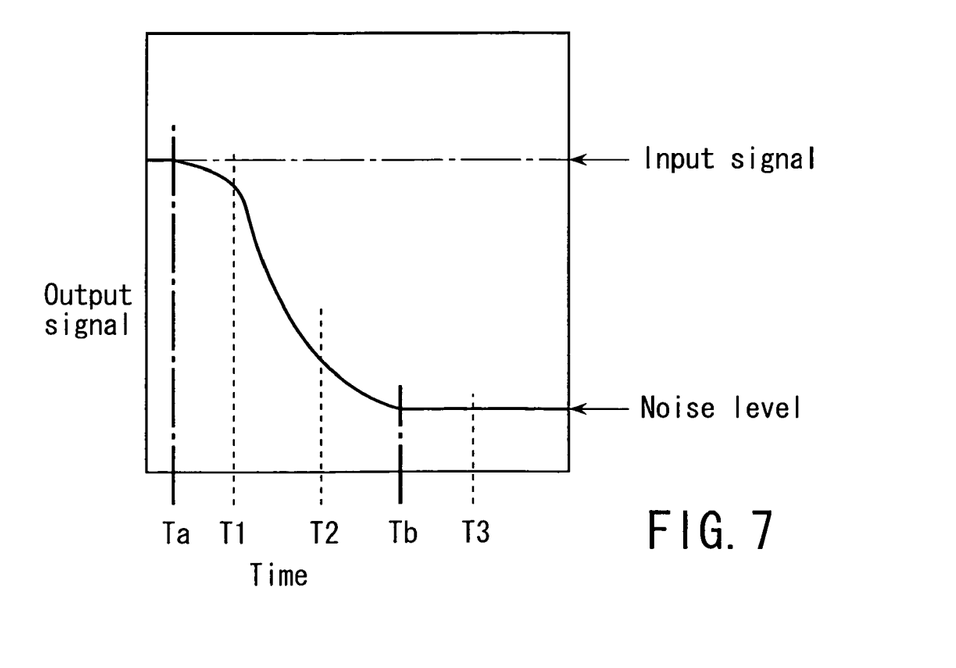
FIG. 7 is a graph illustrating the relationship between the time and the output signal of the aging device 37-1.

FIG. 7 is a graph illustrating the relationship between the time and the output signal of the aging device 37-1. Direct tunneling occurs between time points $T_a$ (=0) and $T_b$, and lastly, the channel disappears, whereby the level of the output signal is reduced to the noise level. Since the aging device 37-1 supplies an output signal corresponding to a change in level between $T_a$ (=0) and $T_b$ (=the time when the output signal level reaches the noise level), the side for receiving the output signal can determine whether or not a predetermined time period has elapsed, or can determine a specific time point (e.g. $T_1$, $T_2$ or $T_3$ shown in FIG. 7) a predetermined time period after the initial state if the relationship between the state of the aging device 37-1 and the level of the output signal is always clear. The time points $T_1$, $T_2$ and $T_3$ correspond to the states 2, 3 and 4 in FIG. 6.

Figure 8:
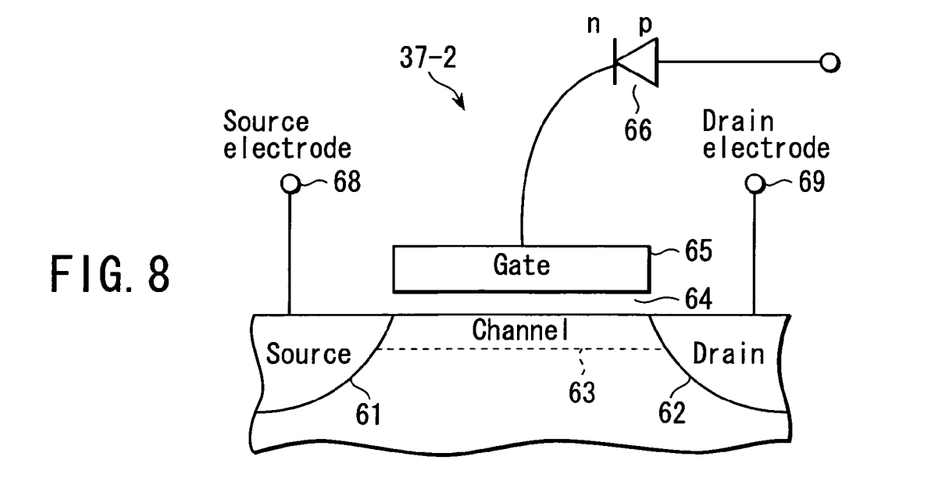
FIG. 8 is a block diagram illustrating a second example for realizing the aging device 37.

FIG. 8 is a second example 37-2 that realizes the aging device 37 of FIG. 4. The aging device 37-2 comprises: a first layer having a source region 61, drain region 62 and channel region 63 therebetween; a second layer provided on the first layer and formed of a tunnel insulation film 64; a third layer provided on the second layer and formed of a gate 65; and a PN junction 66 provided on the third layer for controlling a leak current. A source electrode 68 and drain electrode 69 are provided on the source and drain regions 61 and 62, respectively.

The change in the state of the aging device 37-2 with lapse of time is similar to that of the aging device 37-1, although in the former, current leakage occurs in a PN junction, and in the latter, direct tunneling occurs. Therefore, no description is given of the change in the state of the aging device 37-2 with lapse of time.

Figure 9:
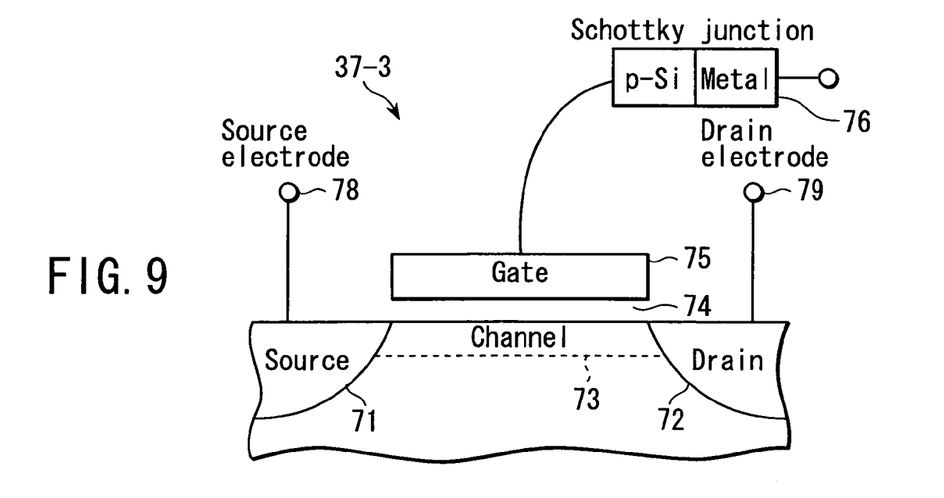
FIG. 9 is a block diagram illustrating a third example for realizing the aging device 37.

FIG. 9 is a third example 37-3 that realizes the aging device 37 of FIG. 4. The aging device 37-3 comprises: a first layer having a source region 71, drain region 72 and channel region 73 therebetween; a second layer provided on the first layer and formed of a tunnel insulation film 74; a third layer provided on the second layer and formed of a gate 75; and a Schottky junction 76 provided on the third layer for controlling a leak current. A source electrode 78 and drain electrode 79 are provided on the source and drain regions 71 and 72, respectively.

The change in the state of the aging device 37-3 with lapse of time is similar to that of the aging device 37-1, although in the former, current leakage occurs in a Schottky junction, and in the latter, direct tunneling occurs. Therefore, no description is given of the change in the state of the aging device 37-3 with lapse of time.

As described above, a pre-process for forming a channel is needed before time measurement is started by the aging device 37. In the embodiment, the pre-process is performed only when charging power is supplied from the IC card case 3 to the aging device 37.

Figure 10:
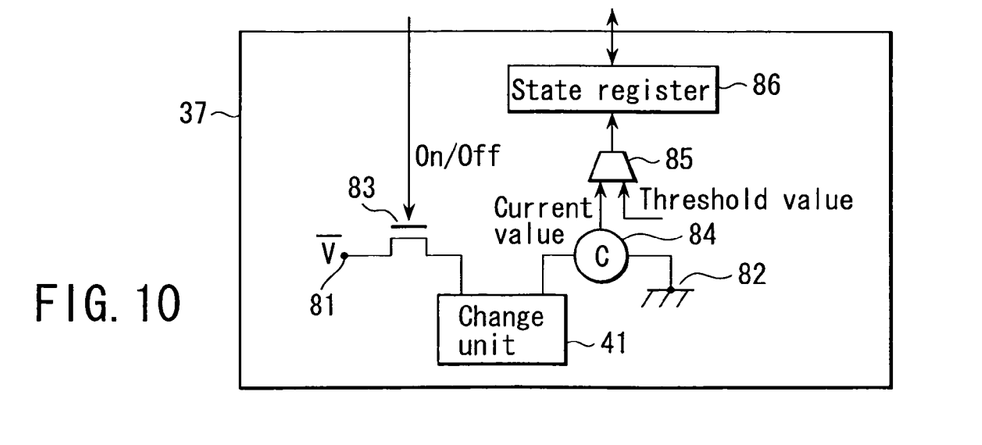
FIG. 10 is a block diagram illustrating the structure of the aging device 37.

Referring now to FIG. 10, the structure of the aging device 37 that incorporates the above-described change unit 41 will be described.

In FIG. 10, a voltage can be applied between the opposite ends of the change unit 41. A power supply terminal 81 is connected to the source electrode 58, 68, 78 of the aging device 37 via a switch element 83, while a GND terminal 82 is connected to the drain electrode 59, 69, 79 via an ampere meter 84.

The switch element 83 is connected to an ON/OFF (enable) signal line that only instantly outputs an ON signal when the supply of power to the IC card 2 starts at the contact unit 31. This signal is turned on when an ON signal is supplied.

The ampere meter 84 is connected to output a current value to a comparator 85. The comparator 95 receives a current value at one input terminal, and a predetermined threshold value at the other input terminal, and outputs a signal of the "H" or "L" level depending upon whether or not the current value is higher than the predetermined threshold value. The output of the comparator 85 is stored in a state register 86. The state register 86 is connected so that the card identification unit 36 can refer to it. When data concerning the state of the aging device 37 is stored in the state register 86, the card identification unit 36 turns on the switch element 83 to thereby apply a predetermined voltage between the power supply terminal 81 and GND terminal 82. The current flowing through the change unit 41 is measured by the ampere meter 84, the measured current value is converted into the "L" or "H" level by the comparator 85, and the resultant "L" or "H" level is stored as the above-mentioned data. To refer to the state of the aging device 37, the card identification unit 36 reads data concerning the state of the aging device 37 from the state register 86.

Figure 11:
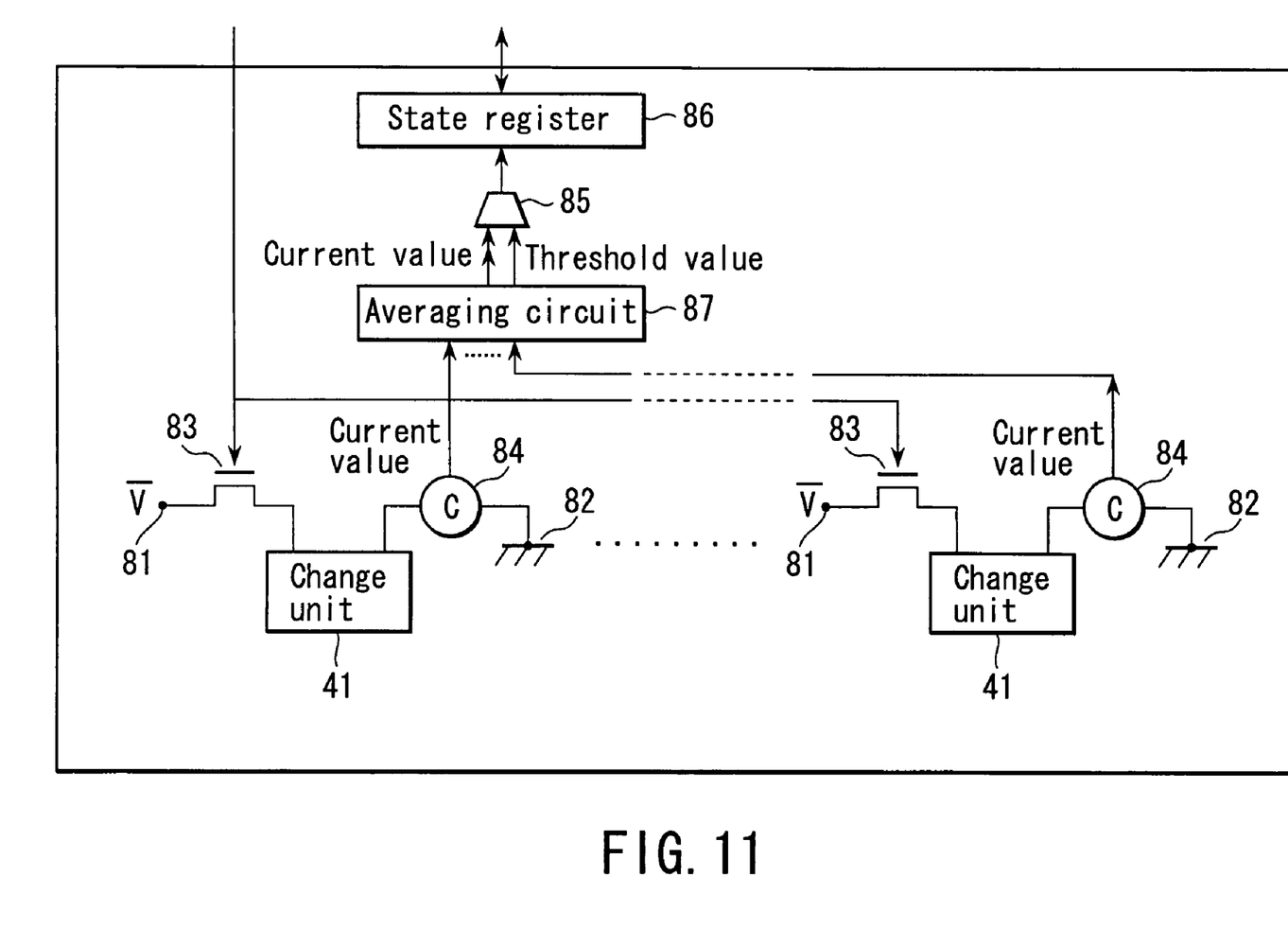
FIG. 11 is a block diagram illustrating another example of the aging device 37.

In the above example, a single change unit 41 is employed. However, the aging device 37 may incorporate a plurality of change units 41. FIG. 11 illustrates an aging device 37 in which a plurality of change units 41 is arranged in parallel, and the current values output from the units 41 are input to an averaging circuit 87, thereby comparing the averaged current value with the threshold by the comparator 85 and storing the "L" or "H" level in the state register 86. The ON/OFF (enable) signal line is connected to the respective switch elements 83 so that the switch elements 83 are commonly controlled. In this example, even if the change units 41 exhibit some different changes in state with lapse of time, their average value enables a stable aging device 37 to be realized.

The IC card case 3 will now be described.

Figure 12:
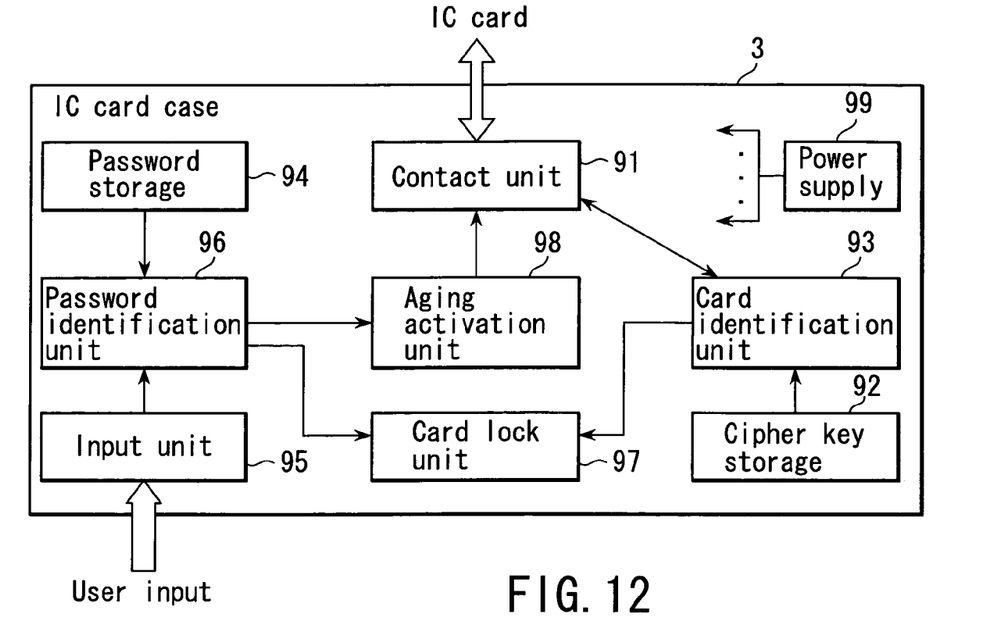
FIG. 12 is a block diagram illustrating an IC card case 3 used in the embodiment.

The owner of the IC card 2 uses the IC card case 3 to house the IC card 2 therein when the owner does not use the card. One IC card case is assigned to each IC card 2. In other words, only if the IC card uniquely corresponding to an IC card case is inserted therein, the IC card case operates normally. FIG. 12 is a block diagram illustrating the configuration of an IC card case 3.

A contact unit 91 is exposed on the inner surface of the IC card case 3 so that it is electrically connected to the contact unit 31 of the IC card 2 when the IC card 2 is housed in the IC card case 3.

A cipher key storage 92 stores a cipher key assigned to the IC card 2. A card identification unit 39 cooperates with the card identification unit 36 of the IC card 2 to determine whether or not the IC card 2 corresponds to the IC card case 3 when the IC card 2 is housed in the IC card case 3. This mutual identification process may be performed utilizing, for example, the transmission protocol stipulated in the ISO/IEC7816 series. If the card identification unit 93 determines that the IC card 2 is legitimate, it informs a card lock unit 97 of this.

A password storage 94 stores a password. If this password is set identical to that of the IC card 2, the usability of the IC card case 3 is enhanced, while if the former is set different from the latter, the security is enhanced. Thus, it is advisable to set the password stored in the storage 94 according to purpose.

An input unit 95 is used by a user to input the password so as to eject the IC card 2 from the IC card case 3. The password identification unit 96 compares the input password with the stored one to determine the legitimacy of the user. If the password identification unit 96 determines that the user is legitimate, it informs the card lock unit 97 and aging activation unit 98 of this.

When it is informed by the card identification unit 93 that the card is legitimate, the card lock unit 97 locks an IC card ejection mechanism (not shown). Further, when it is formed by the password identification unit 96 that the user is legitimate, the card lock unit 97 unlocks the IC chard ejection mechanism. The IC card case 3 may be modified such that the card identification unit 96 informs the card lock unit 97 of a user even if the user is determined to be illegitimate, and the card lock unit 97 does not unlock the IC card ejection mechanism for a predetermined time period even if the user is determined legitimate after they have been determined illegitimate several successive times. This structure further enhances the security.

The aging activation unit 98 supplies aging-device-charging power to the IC card 2 via the contact unit 91 if the password identification unit 96 determines that the user is legitimate. This charging power is supplied using a terminal different from that used to drive each element in the IC card 2.

A power supply 99 is, for example a battery for supplying power, and is used to supply power to each element in the IC card case 3 and to each element in the IC card 2 via the contact unit 91.

A description will be given of operations, performed by the system constructed as above, for housing the IC card 2 into the IC card case 3, ejecting the IC card 2 from the IC card case 3, and using the IC card 2 in the IC card reader 1.

Figure 13:
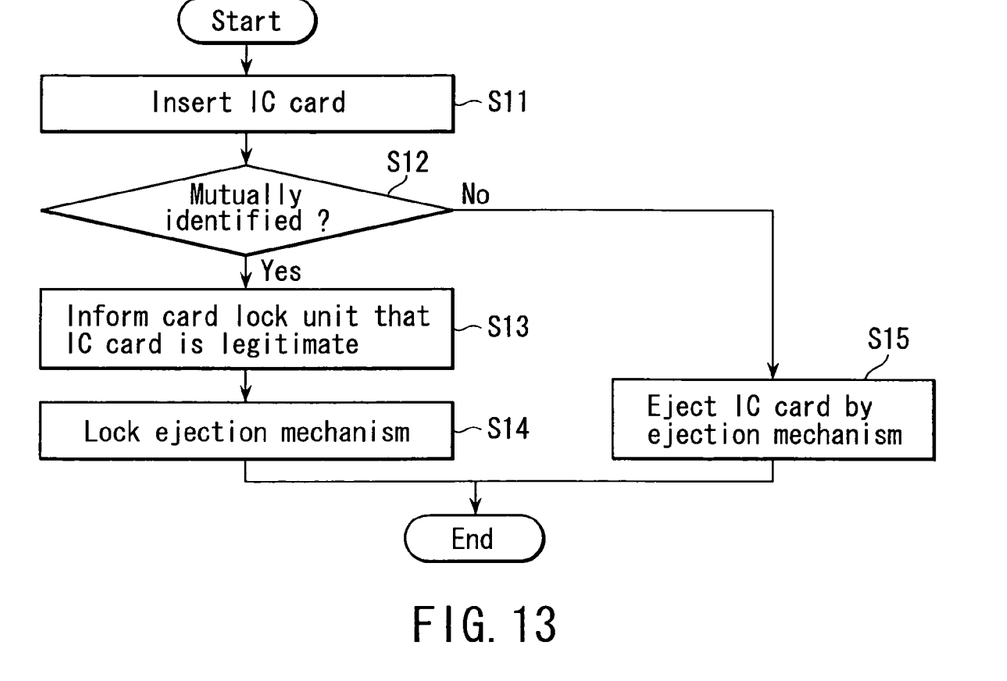
FIG. 13 is a flowchart useful in explaining the operation of housing the IC card 2 into the IC card case 3.

Firstly, referring to FIG. 13, the operation of housing the IC card 2 into the IC card case 3 will be described.

After using the IC card 2, the user inserts the IC card 2 into the IC card case 3 (S11).

When the IC card 2 is inserted in the IC card case 3, mutual identification is performed by the card identification unit 36 of the IC card 2 and the card identification unit 93 of the IC card case 3 (S12). As above-mentioned, this mutual identification process is performed utilizing, for example, the transmission protocol stipulated in the ISO/IEC7816 series.

If the card identification unit 93 of the IC card case 3 determines that the IC card 2 is legitimate, it informs the card lock unit 97 of this (S13). Upon receiving the information, the card lock unit 97 locks the ejection mechanism for ejecting the IC card 2 (S14).

On the other hand, if the card identification unit 93 of the IC card case 3 determines that the IC card 2 is illegitimate, the IC card 2 is forcedly ejected from the case by the ejection mechanism (S15).

The above procedure enables only the IC card uniquely corresponding to an IC card case to be stored therein.

Figure 14:
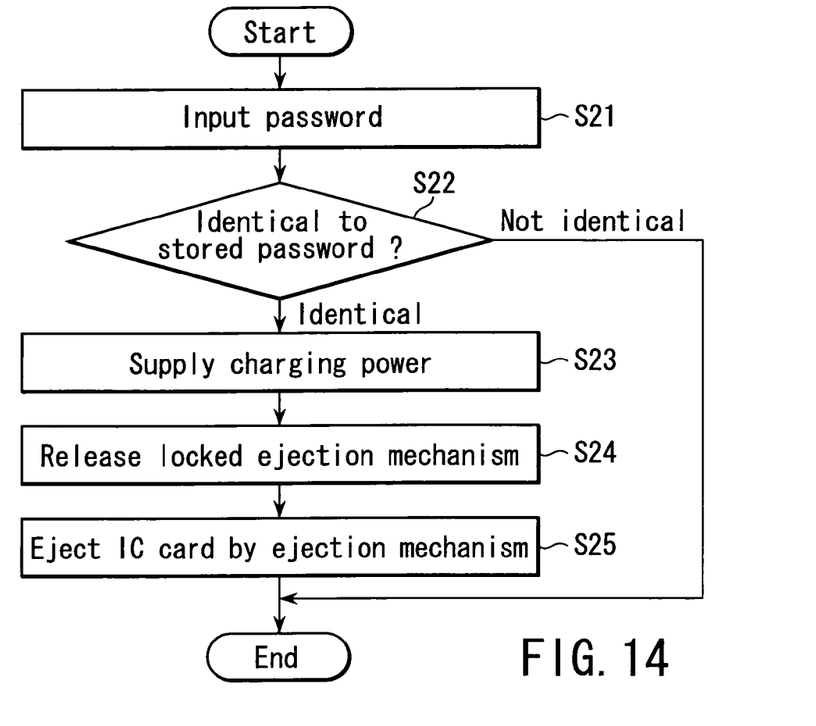
FIG. 14 is a flowchart useful in explaining the operation of ejecting the IC card 2 from the IC card case 3 to use it.

Referring to FIG. 14, a description will be given of the operation of ejecting the IC card 2 from the IC card case 3 to use the card.

When a user utilizes the IC card 2, the user firstly inputs a password for identification through the input unit 95 of the IC card case 3 (S21). The input password is sent to the password identification unit 96, where it is compared with the password read from the password storage 94 (S22).

If it is determined from the comparison that the two passwords are not identical to each other, nothing is performed. This means that the card lock unit 97 keeps the ejection mechanism locked, therefore the IC card 2 cannot be ejected.

If, on the other hand, it is determined at the step S22 that the two passwords are identical, this is reported to the aging activation unit 98, which, in turn, charges the aging device 37 via the contact unit 91 (S23).

After that, the password identification unit 96 informs the card lock unit 97 that the two passwords are determined to be identical at the step S22, whereby the card lock unit 97 releases the ejection mechanism (S24) to permit the IC card 2 to be ejected (S25).

Figure 15:
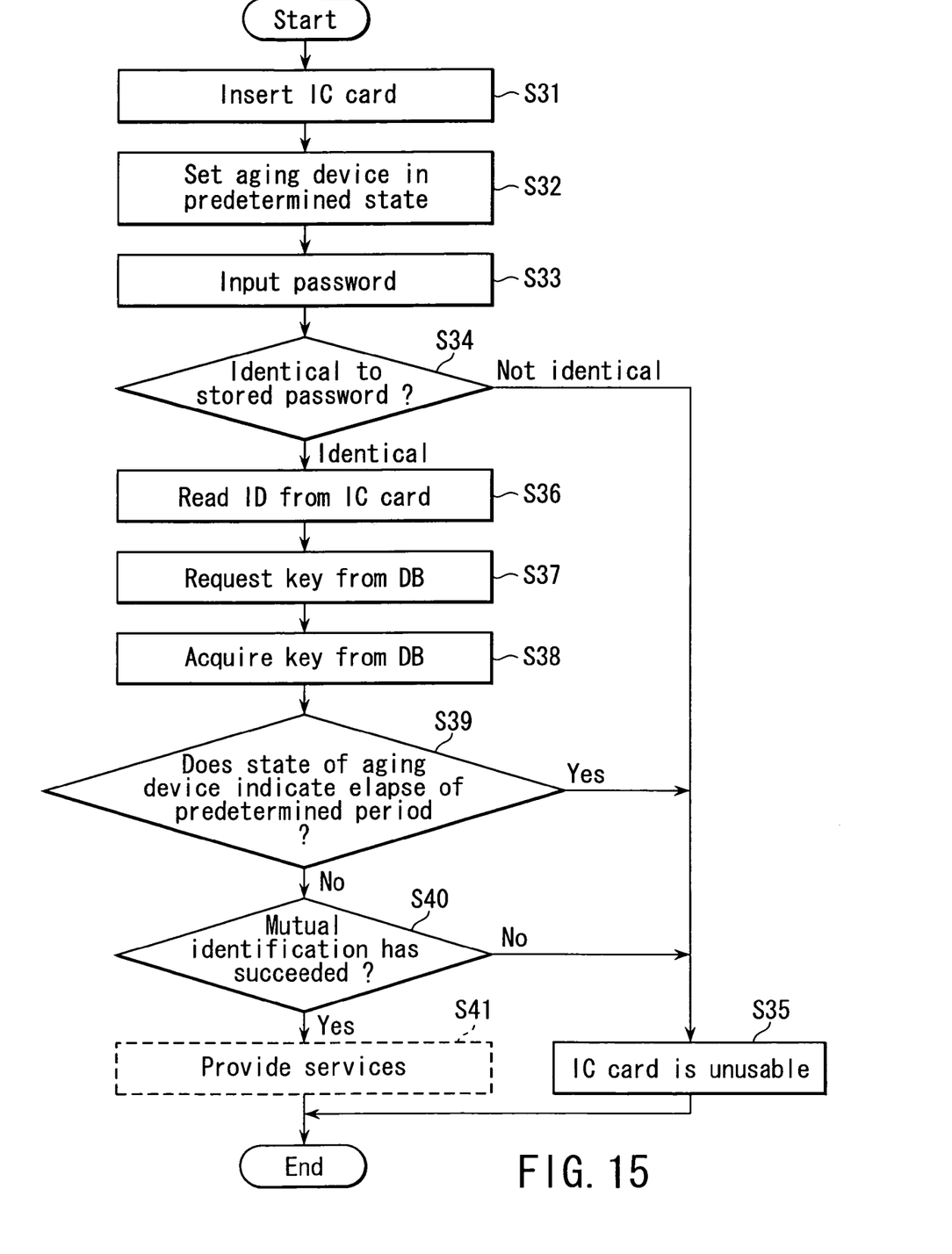
FIG. 15 is a flowchart useful in explaining the operation of permitting a user to use the IC card 2.

Referring then to FIG. 15, the operation of permitting a user to use the IC card 2 will be described.

Firstly, the user inserts the IC card 2 into the IC card reader 1 (S31). In this state, the IC card 2 is charged with power by the IC card reader 1. Upon the supply of power from the card reader 1 to the card 2, an ON signal is supplied to the aging device 37, whereby the aging device 37 stores data indicative of the present state of the change unit 41 in the state register (S32).

Subsequently, the user inputs the password of the IC card 2 to the IC card reader 1 through the input unit 22 (S33). The password identification unit 24 of the IC card reader 1 reads the password from the password storage 33 of the IC card 22, and compares the read password with the input password to determine whether or not they are identical (S34). If they are not identical, it is determined that the user is illegitimate, thereby making it impossible to use the IC card 2 (S35). At this time, for example, an error message is generated and the IC card 2 is ejected.

On the other hand, if the passwords are determined to be identical at the step S34, the cipher key acquisition unit 25 reads an ID from the ID storage 34 of the IC card 2 (S36), thereby issuing a request for a cipher key to the database 4 via the communication unit 26, using the ID (S37). As a result, the cipher key uniquely corresponding to the ID is acquired from the database 4 (S38). The acquired cipher key is transferred to the card identification unit 27.

After that, the card identification unit 36 of the IC card 2 refers to the state of the aging device 37, and determines whether or not the state of the aging device 37 indicates the elapse of a predetermined time period (S39). If it is determined that the state of the aging device 37 indicates the elapse of the predetermined time period, the program proceeds to a step S35, whereas if the state of the aging device 37 indicates the elapse of a time period shorter than the predetermined time period, the program proceeds to a step S40.

Further, if the state of the aging device 37 indicates the elapse of the predetermined time period, the card identification unit 36 of the IC card 2 may perform a process for changing part or the whole portion of a message that is used for identification and is sent to the card identification unit 27 of the IC card reader 1. Alternatively, the unit 36 may send no message. In other words, if the state of the aging device 37 indicates the elapse of the predetermined time period, the card identification unit 36 may make it impossible to perform a correct identification process between the IC card reader 1 and IC card 2.

Thereafter, the card identification unit 27 cooperates with the IC card identification unit 36 of the IC card 2 to perform mutual identification (S40), utilizing, for example, the transmission protocol stipulated in the ISO/IEC7816 series.

If identification has succeeded at the step S40, services are provided (S41). If identification has failed at the step S40, the use of the IC card 2 is prohibited (S35). Of course, there may be a case where identification has failed at the step S40 for reasons other than the reason that the aging device 37 indicates the elapse of the predetermined time period.

The period of validity can be set in the above-described IC card 2 of the embodiment without providing the card with a power supply, such as a battery. Further, when the IC card 2 is ejected from a card case uniquely corresponding to the card, it is checked whether or not a legitimate user tries to use the card 2, and then measurement of the period of use is started. Therefore, in light of the required period of use, the period of the validity of the card can be set to a relatively short period. When the period of validity is set short, even if the card 2 is lost and acquired by a third party, the possibility of illegal use by the third party is reduced because the period of validity will soon be expired. Thus, the security is enhanced.

Further, after the expiration of a set period of validity, a legitimate user can use the IC card 2 again simply by charging the IC card 2 by the IC card case 3, without a complicated operation (for example, accessing the service company to ask the resumption of use).

In the embodiment, the function of making it impossible to use the IC card 2 after the expiration of the period of validity determined by the aging device 37 is realized by the card identification unit 36 that utilizes the information, on the state of the aging device 37, held in the state register. The embodiment of the invention is not limited to this, but may be modified in various ways. For example, the power supply unit 38 may control the supply of power to each element based on the contents of the state register. Alternatively, a switch may be provided across the line between each element and the contact unit 31, thereby performing ON/OFF control of the switch.

Furthermore, in the embodiment, the aging device 37 is charged via the charging terminal of the contact unit 91. However, a message (command for IC cards) for an identification process between the IC card 2 and IC card case 3 (performed using the transmission protocol stipulated in the ISO/IEC7816 series) can be utilized to charge the aging device 37. Although the format of the message is determined by the protocol, part of the message can be set by a vender. Accordingly, the instruction to charge the aging device 37 may be contained in the message sent from the IC card case 3 to the IC card 2, thereby making the power supply unit 38 of the IC card 2 charge the aging device 37.

Although in the embodiment, the user identification is performed utilizing password identification, another identification system, such as fingerprint identification or biological identification, can be utilized.

Also, in the embodiment, the protocol used for the card identification process between the IC card 2 and IC card reader 1 is also used for that between the IC card 2 and IC card case 3. However, a dedicated protocol may be used for the card identification process between the IC card 2 and IC card case 3, since it does not influence the existing IC card systems.

In addition, in the embodiment, the IC card 2 is inserted into the IC card reader 1, and their contact units are connected. However, the connection method is not limited to this. For example, the IC card 2 and IC card reader 1 may have their respective coils capable of receiving electromagnetic waves, so that they can be connected to each other out of contact with each other.

The above-described IC card system has been devised to consider the case where only the IC card 2 is lost. Since, however, the IC card case 3 is also carried by an IC card owner, it is possible to lose the IC card case 3 with the IC card housed therein. In light of this, the power supply 99 of the IC card case 3 may be constructed such that it is charged only by the charger dedicated thereto. By virtue of this structure, the security is further enhanced. Lastly, a modification, in which this structure is added to the above-described embodiment, will be described.

Figure 16:
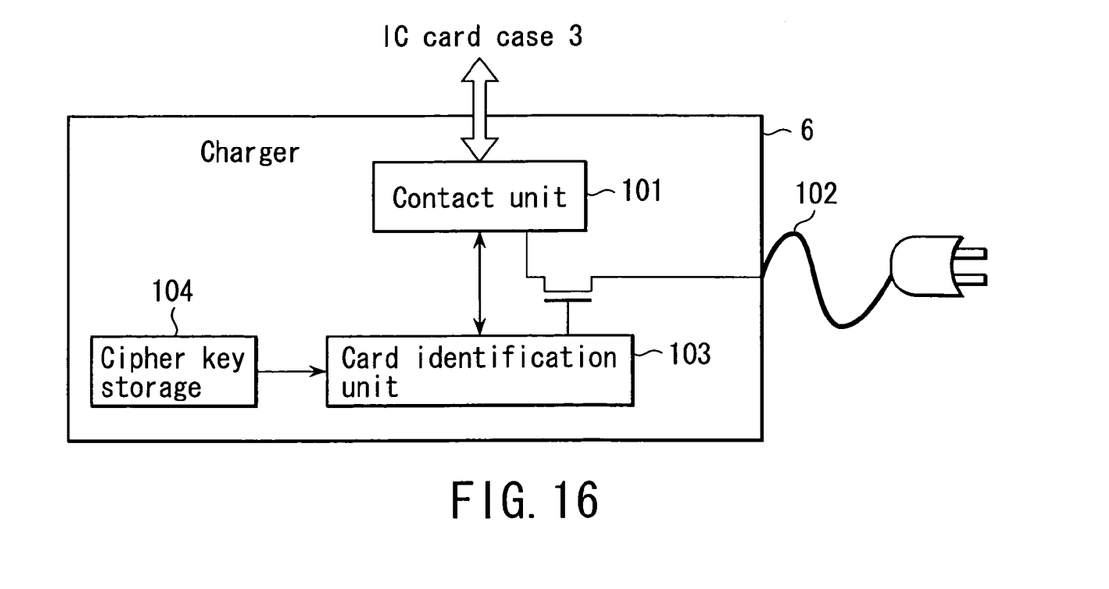
FIG. 16 is a block diagram illustrating a charger 6.

FIG. 16 is a block diagram illustrating a charger 6.

The charger 6 has the same shape as the IC card 2, and is constructed such that an AC cord 102 is exposed to the outside when the charger 6 is attached to the IC card case 3.

As shown in FIG. 16, to attach the charger 6 to the IC card case 3, a contact unit 101 is opposed to the contact unit 91 of the IC card case 3. When the charger 6 is attached to the IC card case 3, the contact units 101 and 91 are electrically connected.

A cipher key storage 104 stores the same cipher key as that for the IC card 2.

A card identification unit 103 cooperates with the card identification unit 93 of the IC card case 3 to determine whether or not the IC card case 3 uniquely corresponds to the charger 6 when they are attached to each other. The card identification unit 103 transmits and receives messages, using the cipher key stored in the cipher key storage 104, and performs identification using the transmission protocol stipulated in the ISO/IEC7816 series. If the card identification unit 103 determines that the IC card case 3 is legitimate, it permits AC power to be supplied from the AC cord 102, connected to an AC power supply (not shown), to the IC card case 3 via the contact unit 101. The power supply 99 of the IC card case 3 is charged with the AC power. If it is determined as a result of mutual identification that the IC card case 3 is illegitimate, no power is supplied from the AC cord 102 to the contact unit 101.

As described above, the charger 6 employed in the modification charges the IC card case 3 after the legitimacy of the case is confirmed by card identification. Even if the IC card case 3 with the IC card 2 housed therein is lost and a third party acquires it, the third party cannot illegally utilize the IC card 2. This is because the power remaining in the IC card case 3 is consumed while the third party is trying to eject the card 2 from the case 3 by repeatedly inputting random passwords, and because once the power has been consumed, no further power can be charged in the power supply 99 of the IC card case 3, thereby preventing illegal use of the IC card 2.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of setting a validity period of an IC card, comprising:

preparing an IC card including a change unit whose state changes with lapse of time starting from an initial state without an external power, a measuring unit configured to measure the state of the change unit so as to generate information indicating whether or not the validity period has elapsed, and an operation unit configured to be operable if the information indicates that the validity period fails to have yet elapsed, and to be inoperable if the information indicates that the validity period has elapsed;

preparing an IC card case capable to house the IC card by a user, the IC card case including an identification unit configured to determine whether or not the user is legitimate;

performing user identification utilizing the identification unit, when the IC card is housed in the IC card case; and transmitting a signal to the change unit in the IC card depending on a result of the user identification, the signal initializing the change unit to the initial state.

2. The method according to claim 1, wherein:

the IC card case further includes a lock unit configured to lock the IC card in the IC card case; and the lock unit is released after the signal is transmitted to the change unit.

3. The method according to claim 2, wherein the IC card and the IC card case further include comparison units configured to compare an ID of the IC card with an ID of the IC card case, the comparison units comparing the IDs when the IC card is housed into the IC card case, the lock unit being operated if the IDs are identical to each other.

4. The method according to claim 1, wherein the operation unit includes a comparison unit configured to compare an ID of the IC card with an ID of an IC card reader.

5. The method according to claim 1, wherein the operation unit includes an acquisition unit configured to acquire the external power from an external device and supply the external power to an interior of the IC card.

6. The method according to claim 1, wherein the IC card case further includes a determination unit configured to determine whether or not the IC card is a preset IC card, when the IC card case houses the IC card, the IC card case also including a lock unit configured to lock the IC card in the IC card case if the determination unit determines that the IC card is the preset IC card, the lock unit being released after the signal is transmitted to the change unit.

7. The method according to claim 1, wherein the change unit including an aging device utilized to measure time, a state of the aging device determining lapse of time.

* * * * *